United States Patent
Yeon et al.

(10) Patent No.: US 8,892,476 B2
(45) Date of Patent: Nov. 18, 2014

(54) SERVER FOR AN IMAGE FORMING APPARATUSES WHICH CALCULATES CHARGES ACCORDING TO PRINTING USAGE AMOUNTS

(75) Inventors: Jung Mo Yeon, Seoul (KR); Seoung Soo Oak, Seongnam-si (KR); Byung Oh Park, Suwon-si (KR); Hwan Joon Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 97 days.

(21) Appl. No.: 13/443,463

(22) Filed: Apr. 10, 2012

(65) Prior Publication Data

US 2013/0016391 A1 Jan. 17, 2013

(30) Foreign Application Priority Data

Jul. 13, 2011 (KR) .................. 10-2011-0069445

(51) Int. Cl.
*G06F 17/00* (2006.01)
*G06F 3/12* (2006.01)

(52) U.S. Cl.
CPC ............ *G06F 3/1203* (2013.01); *G06F 3/1273* (2013.01); *G06F 3/1285* (2013.01)
USPC ........................................................ 705/400

(58) Field of Classification Search
CPC ................................................ G06F 2206/1504
USPC ......................................... 358/1.15; 705/400
See application file for complete search history.

(56) References Cited

U.S. PATENT DOCUMENTS

2003/0191655 A1* 10/2003 Janz ................................. 705/1
2005/0065894 A1* 3/2005 Inaba ............................ 705/400

* cited by examiner

*Primary Examiner* — Eric A Rust
(74) *Attorney, Agent, or Firm* — Staas & Halsely LLP

(57) ABSTRACT

A server for image forming apparatuses which calculates charges reasonable to both a service manager and a user, and a control method thereof is provided. The server for image forming apparatuses includes a server input unit to receive charging criteria of image forming apparatuses and a charging criterion of a virtual image forming apparatus, a server communication unit to receive information regarding output amounts from the image forming apparatuses, and a server control unit to generate the virtual image forming apparatus and to calculate charges of the image forming apparatuses according to the charging criterion of the virtual image forming apparatus, when the output amounts of the image forming apparatuses are less than basic output amounts of the charging criteria of the image forming apparatuses, thereby being capable of calculating charges reasonable to both the service manager and the user.

12 Claims, 14 Drawing Sheets

| CHARGING CRITERION NAME | BASIC OUTPUT NUMBER | BASIC CHARGE | UNIT COST PER SHEET |
|---|---|---|---|
| COLOR MULTI-FUNCTIONAL MACHINE 1 | 5,000 | $200.00 | $0.02 |

FIG. 3

| CHARGING CRITERION NAME | BASIC OUTPUT NUMBER | BASIC CHARGE | UNIT COST PER SHEET |
|---|---|---|---|
| Plan A | 2,000 | $100.00 | $0.02 |

FIG. 4

| VIRTUAL IMAGE FORMING APPARATUS NAME (110) | V1000 | |
|---|---|---|
| CHARGING CRITERION (111) | Plan A | SEARCH |
| MANAGEMENT METHOD (112) | ☐ MANUAL<br>☐ AUTOMATIC | |
| | NEXT | CANCEL |

| Model | Device S/N | Device IP | Device Name | Location |
|---|---|---|---|---|
| Samsung CLX-9350 Series | Z0T0B1D800001P | X.X.X.X | SEC0015995B92D0 | 10TH FLOOR |
| SCX-6555N | 14BUB1BZA00046R | X.X.X.X | SEC0015991E8315 | 9TH FLOOR |
| Lexmark C782 | 940T7N6-77-0 | X.X.X.X | 940T7N6-77-0 | 1TH FLOOR |

CONFIRM   CANCEL

ALL (130)
— Client A
— Client B

FIG. 7

| CHARGING CRITERION NAME | BASIC OUTPUT NUMBER | BASIC CHARGE | UNIT COST PER SHEET |
|---|---|---|---|
| COLOR MULTI-FUNCTIONAL MACHINE 1 | 5,000 | $200.00 | $0.02 |

FIG. 8

| Model | Device S/N | Device IP | Device Name | Location |
|---|---|---|---|---|
| Samsung CLX-9350 Series | Z0T0B1D800001P | X.X.X.X | SEC0015995B92D0 | 10$^{TH}$ FLOOR |
| SCX-6555N | 14BUB1BZA00046R | X.X.X.X | SEC0015991E8315 | 9$^{TH}$ FLOOR |
| Lexmark C782 | 940T7N6-77-0 | X.X.X.X | 940T7N6-77-0 | 1$^{TH}$ FLOOR |

FIG. 9

```
┌─────────────────────────────────────────────────────────────────┐
│ CONDITION OF IMAGE FORMING APPARATUS TO BE ALLOTTED TO VIRTUAL  │
│ IMAGE FORMING APPARATUS                                         │
├─────────────────────────────────────────────────────────────────┤
│                                                                 │
│   DIRECT INPUT OF BASIC OUTPUT NUMBER (140)                     │
│   ┌──────────────────┐                                          │
│   │                  │                                          │
│   └──────────────────┘                                          │
│                                                                 │
│   CHARGE POLICY (141)                                           │
│     ☐ COMPARISON TO MODEL BASIC OUTPUT NUMBER        ┌────┐ %   │
│                                                      └────┘     │
│     ☐ COMPARISON TO IMAGE FORMING APPARATUS          ┌────┐ %   │
│       BASIC OUTPUT NUMBER                            └────┘     │
│                                                                 │
│                                                                 │
│                                          ┌──────────┐ ┌──────┐  │
│                                          │ PREVIOUS │ │ NEXT │  │
│                                          └──────────┘ └──────┘  │
└─────────────────────────────────────────────────────────────────┘
```

FIG. 10

| CHARGING CRITERION NAME | BASIC OUTPUT NUMBER | BASIC CHARGE | UNIT COST PER SHEET |
|---|---|---|---|
| SCX-655L | 2,000 | $100.00 | $0.02 |

FIG. 11

```
SCALE OF IMAGE FORMING APPARATUS TO BE ALLOTTED

NUMBER OF IMAGE FORMING APPARATUS (150)
    ☐ DIRECT INPUT
      [          ]

☐ 10
    ☐ 50
    ☐ 100

OUTPUT NUMBER (151)
    ☐ COMPARISON TO VIRTUAL IMAGE FORMING      [   ] %
      APPARATUS BASIC OUTPUT NUMBER

[ PREVIOUS ]  [ NEXT ]
```

FIG. 12

| CHARGING CRITERION NAME | BASIC OUTPUT NUMBER | BASIC CHARGE | UNIT COST PER SHEET |
|---|---|---|---|
| Samsung CLX-9350 Series | 2,000 | $200.00 | $0.03 |

| CHARGING CRITERION NAME | BASIC OUTPUT NUMBER | BASIC CHARGE | UNIT COST PER SHEET |
|---|---|---|---|
| SCX-6555N | 3,000 | $300.00 | $0.02 |

| CHARGING CRITERION NAME | BASIC OUTPUT NUMBER | BASIC CHARGE | UNIT COST PER SHEET |
|---|---|---|---|
| Lexmark C782 | 1,000 | $100.00 | $0.01 |

| CHARGING CRITERION NAME | BASIC OUTPUT NUMBER | BASIC CHARGE | UNIT COST PER SHEET |
|---|---|---|---|
| COLOR MULTI-FUNCTIONAL MACHINE 2 | 5,000 | $300.00 | $0.03 |

FIG. 13

| Model | Device S/N | Device IP | Device Name | Location |
|---|---|---|---|---|
| MODEL A (Samsung CLX-9350 Series) | Z0TOB1D800001P | X.X.X.X | SEC0015995B92D0 | 10$^{TH}$FLOOR |
| MODEL B (SCX-6555N) | 14BUB1BZA00046R | X.X.X.X | SEC0015991E8315 | 9$^{TH}$FLOOR |
| MODEL C (Lexmark C782) | 940T7N6-77-0 | X.X.X.X | 940T7N6-77-0 | 1$^{TH}$FLOOR |

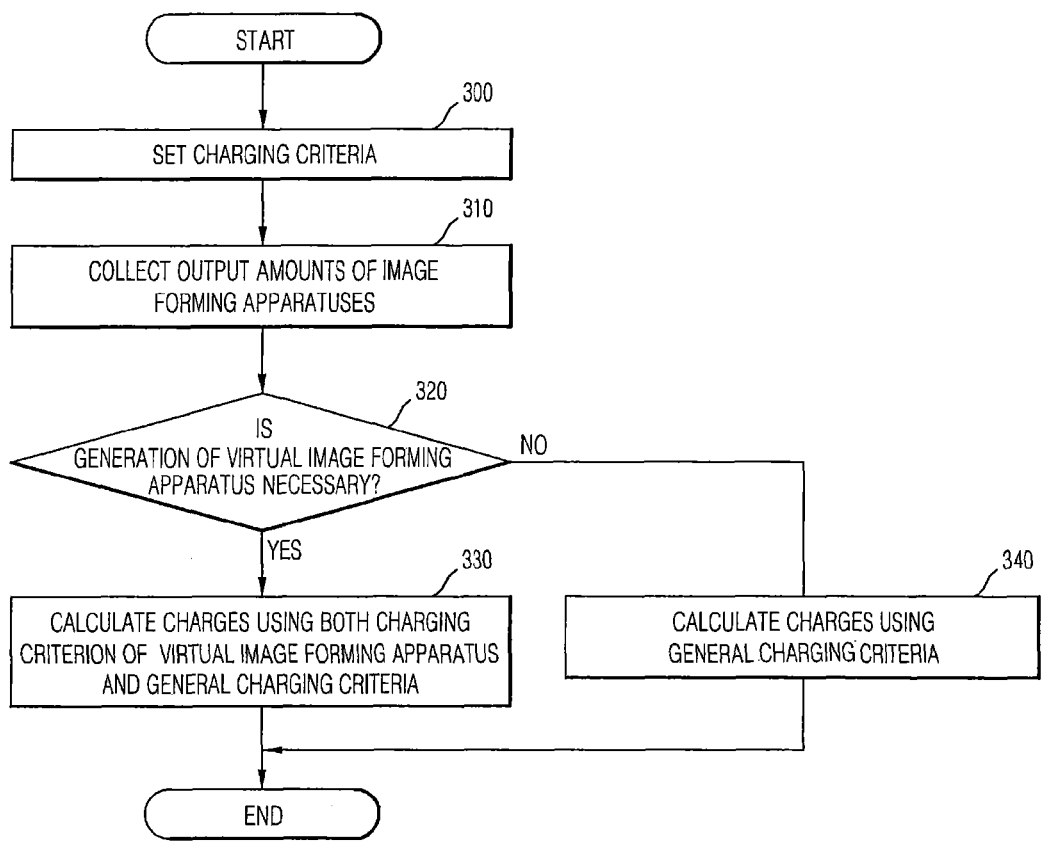

SERVER FOR AN IMAGE FORMING APPARATUSES WHICH CALCULATES CHARGES ACCORDING TO PRINTING USAGE AMOUNTS

CROSS-REFERENCE TO RELATED APPLICATIONS

This application claims the priority benefit of Korean Patent Application No. 2011-0069445, filed on Jul. 13, 2011 in the Korean Intellectual Property Office, the disclosure of which is incorporated herein by reference.

BACKGROUND

1. Field

Embodiments relate to a server for image forming apparatuses which calculates charges according to printing usage amounts, and a control method thereof.

2. Description of the Related Art

In general, image forming apparatuses form images printed on sheets of paper. The image forming apparatuses may be implemented as a copier, a facsimile and a multi-functional machine.

Recently, demand for the image forming apparatuses as office automation equipment, such as a multi-functional machine having functions of a scanner and a facsimile, have been gradually increased. Therefore, development of expensive high-performance products of image forming apparatuses, inherent functions of which are extended to execute various functions, is underway.

Such expensive image forming apparatuses are used in a rental type rather than in a purchasing type.

If an image forming apparatus is used in the rental type, a provider judges a usage amount by performing a simulation of a sampling group for a designated period prior to a rental contract, and makes the rental contract based on a charging condition in consideration of a printing scale of a user and a contract period. The charging condition includes a basic charge and a unit cost per sheet. The basic charge is a charge for a basic output amount and needs to be paid even if the user does not use all of the basic output amount.

SUMMARY

In an aspect of embodiments, there is provided a server for image forming apparatuses which calculates charges reasonable to both a service manager and a user, and a control method thereof.

Additional aspects of embodiments will be set forth in part in the description which follows or may be learned by practice of embodiments.

In accordance with an aspect of embodiments, a server for image forming apparatuses includes a server input unit to receive charging criteria of image forming apparatuses and a charging criterion of a virtual image forming apparatus, a server communication unit to receive information regarding output amounts from the image forming apparatuses, and a server control unit to generate the virtual image forming apparatus and to calculate charges of the image forming apparatuses according to the charging criterion of the virtual image forming apparatus, when the output amounts of the image forming apparatuses are less than basic output amounts of the charging criteria of the image forming apparatuses.

The generation of the virtual image forming apparatus by the server control unit may include generating the virtual image forming apparatus by manually receiving image forming apparatuses allotted to the virtual image forming apparatus.

The generation of the virtual image forming apparatus by the server control unit may include generating the virtual image forming apparatus to which image forming apparatuses having output amounts less than the basic output amounts of the charging criteria of the image forming apparatuses are allotted.

The server control unit may generate the virtual image forming apparatus according to a restriction condition for the number of the virtual image forming apparatus or a restriction condition for the output amounts.

When the number of image forming apparatuses allotted to the virtual image forming apparatus does not satisfy the restriction condition for the number, the server control unit may generate a plurality of virtual image forming apparatuses and divide the number of the allotted image forming apparatuses according to the plurality of virtual image forming apparatuses.

When the sum of the output amounts of image forming apparatuses allotted to the virtual image forming apparatus does not satisfy the restriction condition for output amounts, the server control unit may generate a plurality of virtual image forming apparatuses and divide the sum of the output amounts of the allotted image forming apparatuses according to the plurality of virtual image forming apparatuses.

The server control unit may calculate charges of image forming apparatuses, which are allotted to the virtual image forming apparatus, according to the charging criterion of the virtual image forming apparatus, and calculate charges of image forming apparatuses, which are not allotted to the virtual image forming apparatus, according to the charging criterion of the image forming apparatuses.

The server for image forming apparatuses may further comprise a server display unit to display a user interface which displays input from a user, which is used by the server control unit to generate the virtual image forming apparatus.

In accordance with an aspect of embodiments, there is provided a control method of a server for image forming apparatuses includes receiving charging criteria of image forming apparatuses and a charging criteria of a virtual image forming apparatus, receiving information regarding output amounts from the image forming apparatuses, and generating the virtual image forming apparatus and calculating charges of the image forming apparatuses according to the charging criterion of the virtual image forming apparatus, when the output amounts of the image forming apparatuses are less than basic output amounts of the charging criteria of the image forming apparatuses.

The generation of the virtual image forming apparatus by the server control unit may include generating the virtual image forming apparatus by manually receiving image forming apparatuses allotted to the virtual image forming apparatus.

The generation of the virtual image forming apparatus by the server control unit may include generating the virtual image forming apparatus to which image forming apparatuses having output amounts less than the basic output amounts of the charging criteria of the image forming apparatuses are allotted.

The generation of the virtual image forming apparatus by the server control unit may include generating the virtual image forming apparatus according to a restriction condition for the number of the virtual image forming apparatus or a restriction condition for the output amounts.

When the number of image forming apparatuses allotted to the virtual image forming apparatus does not satisfy the restriction condition for the number, a plurality of virtual image forming apparatuses may be generated and the number of the allotted image forming apparatuses may be divided according to the plurality of virtual image forming apparatuses.

When the sum of the output amounts of image forming apparatuses allotted to the virtual image forming apparatus does not satisfy the restriction condition for output amounts, a plurality of virtual image forming apparatuses may be generated and the sum of the output amounts of the allotted image forming apparatuses may be divided according to the plurality of virtual image forming apparatuses.

Charges of image forming apparatuses, which are allotted to the virtual image forming apparatus, may be calculated according to the charging criterion of the virtual image forming apparatus, and charges of image forming apparatuses, which are not allotted to the virtual image forming apparatus, may be calculated according to the charging criterion of the image forming apparatuses.

The output amounts of the image forming apparatuses being less than basic output amounts of the charging criteria of the image forming apparatuses may denote that the output amounts of the image forming apparatuses are less than basic output amounts of models of the charging criteria of the image forming apparatuses or basic output amounts of the image forming apparatuses.

BRIEF DESCRIPTION OF THE DRAWINGS

These and/or other aspects of embodiments will become apparent and more readily appreciated from the following description of embodiments, taken in conjunction with the accompanying drawings of which:

FIG. 3 is a table illustrating a charging criterion used in the server for image forming apparatuses in accordance with an embodiment;

FIG. 4 is an interface screen used to set a virtual image forming apparatus in the server for image forming apparatuses in accordance with an embodiment;

FIG. 7 is a table illustrating a charging criterion used in the server for image forming apparatuses in accordance with an embodiment;

FIG. 8 is a table illustrating charging criteria to respective models used in the server for image forming apparatuses in accordance with an embodiment;

FIG. 9 is an interface screen used to automatically add a virtual image forming apparatus in the server for image forming apparatuses in accordance with an embodiment;

FIG. 10, is a table illustrating a charging criterion to a model used in the server for image forming apparatuses in accordance with an embodiment;

FIG. 11 is an interface screen used to set the scale of a virtual image forming apparatus in the server for, image forming apparatuses in accordance with an embodiment;

FIG. 12 shows a table illustrating charging criteria used in the server for image forming apparatuses in accordance with an embodiment;

FIG. 13 is a table illustrating charging criteria to respective models used in the server for image forming apparatuses in accordance with an embodiment; and FIG. 14 is a flowchart illustrating calculation of charges by generating a virtual image forming apparatus in the server for image forming apparatuses in accordance with an embodiment.

DETAILED DESCRIPTION

Figure 1:
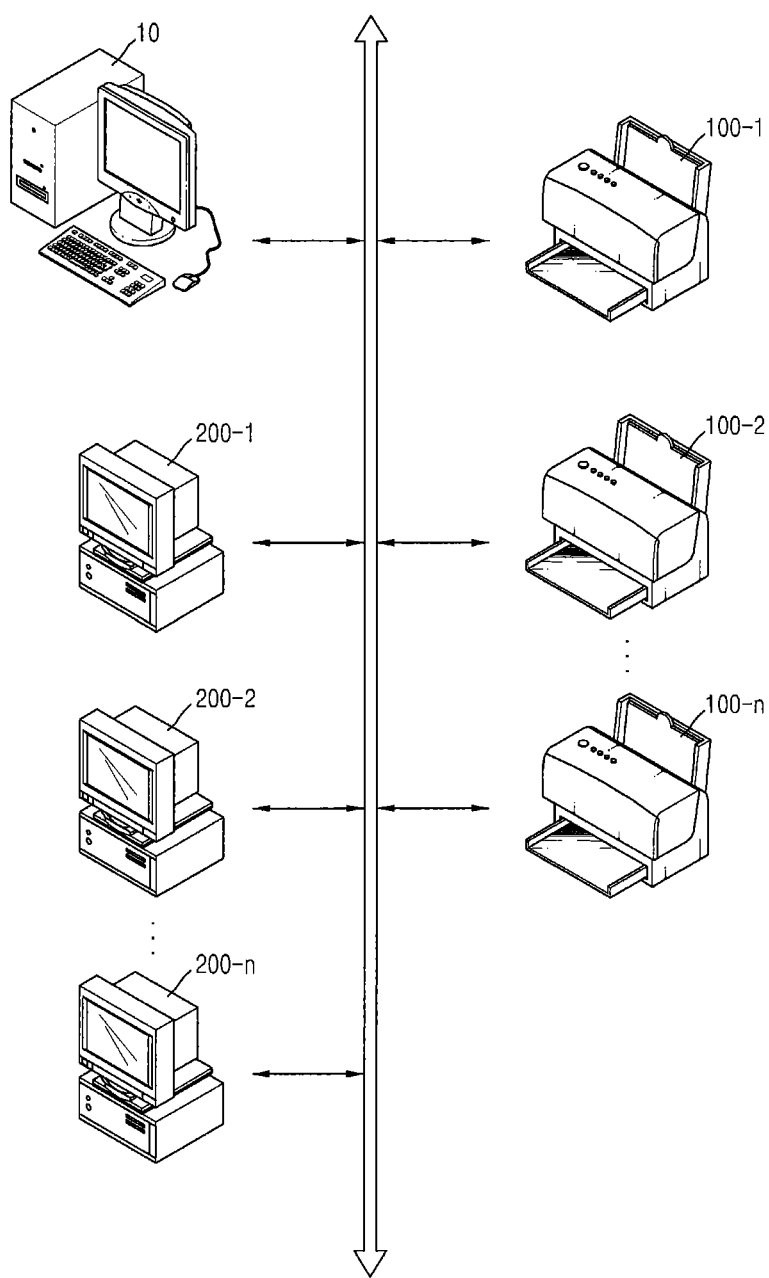
FIG. 1 is a block diagram illustrating image forming apparatuses, host apparatuses and a server for image forming apparatuses in accordance with an embodiment.

Reference will now be made in detail to embodiments, examples of which are illustrated in the accompanying drawings, wherein like reference numerals refer to like elements throughout.

FIG. 1 is a block diagram illustrating image forming apparatuses, host apparatuses and a server for image forming apparatuses in accordance with an embodiment.

A server 10 for image forming apparatuses may be connected to at least one image forming apparatus 100-1, 100-2, . . . 100-n and at least one host apparatus 200-1, 200-2, . . . 200-n.

The server 10 for image forming apparatuses may be designed such that the server 10 for image forming apparatuses is provided separately from the host apparatuses 200-1, 200-2, . . . 200-n or one of the host apparatuses 200-1, 200-2, . . . 200-n functions as the server 10 for image forming apparatuses. If one of the host apparatuses 200-1, 200-2, . . . 200-n functions as the server 10 for image forming apparatuses, the server 10 for image forming apparatuses may be included in the corresponding host apparatus.

The server 10 for image forming apparatuses is connected to at least one image forming apparatus 100-1, 100-2, . . . 100-n and collects output amount information from the at least one connected image forming apparatus 100-1, 100-2, . . . 100-n. The at least one image forming apparatus 100-1, 100-2, . . . 100-n is connected to the at least one host apparatus 200-1, 200-2, . . . 200-n through a communication network.

Figure 2:
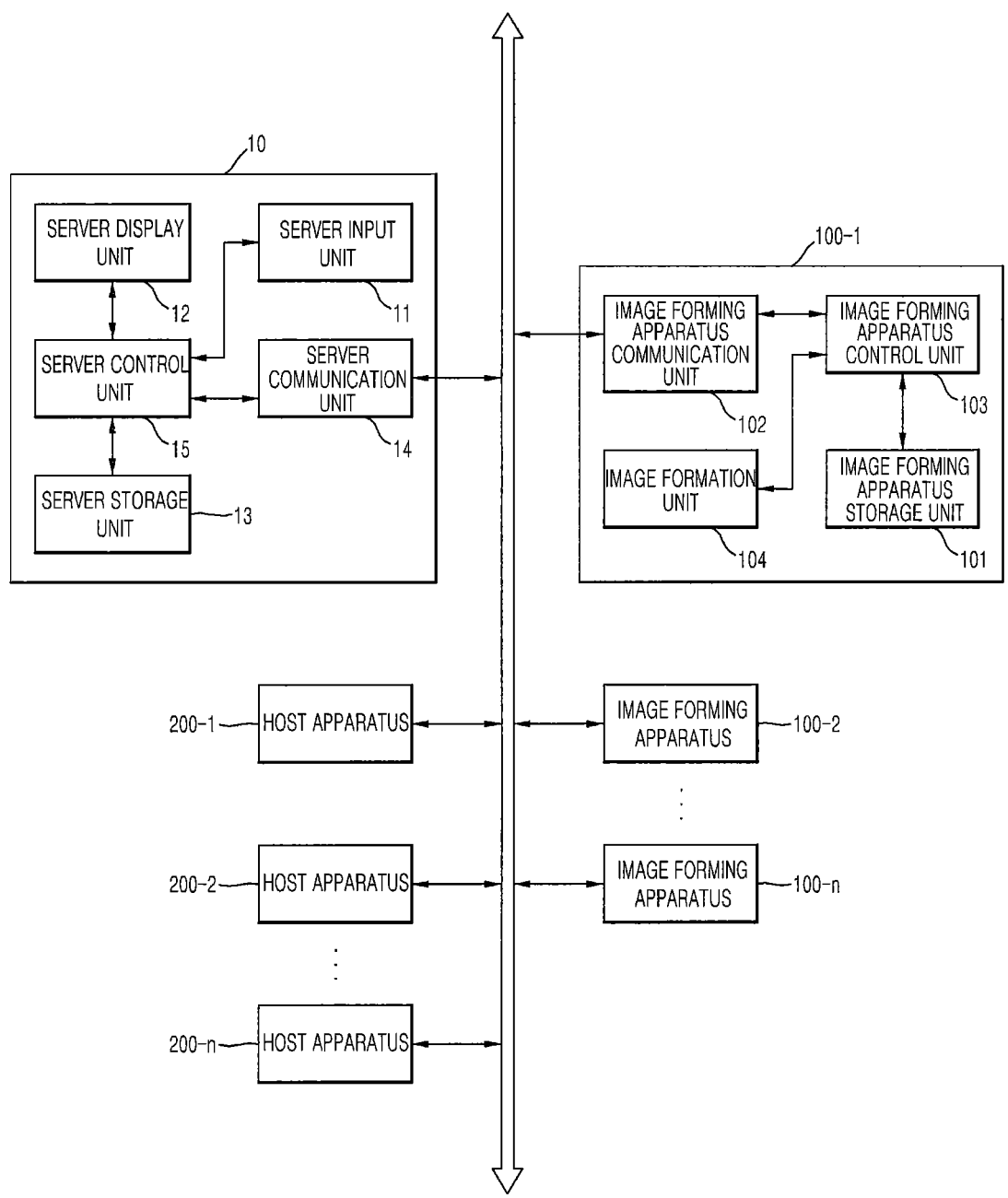
FIG. 2 is a block diagram illustrating internal configurations of the image forming apparatuses, the host apparatuses and the server for image forming apparatuses in accordance with an embodiment.

FIG. 2 is a block diagram illustrating internal configurations of the image forming apparatuses 100-1, 100-2, . . . 100-n, the host apparatuses 200-1, 200-2, . . . 200-n and the server 10 for image forming apparatuses in accordance with an embodiment.

The server 10 for image forming apparatuses includes a server input unit 11, a server display unit 12, a server storage unit 13, a server communication unit 14 and a server control unit 15.

The server input unit 11 may include a keyboard, a mouse, etc. provided as input devices of the server 10 for image forming apparatuses. The server input unit 11 may include a graphical user interface generated by executing a driver or a separate application.

The server input unit 11 may receive a charging criterion for a printing output amount of the at least one image forming apparatus 100-1, 100-2, . . . 100-n from a server manager. The charging criterion may include a charging criterion name, a basic output number, a basic charge and a unit cost per sheet, with reference to FIG. 3. The charging criterion name refers to a name of a specific charging criterion, the basic output number is the number of sheets of paper basically output desired by a user, the basic charge and the unit cost per sheet are set according to the basic output number, the basic charge is a charge to be paid regardless of the output amount, and the unit cost per sheet refers to an individual unit cost per output sheet of paper. The total charge may be calculated by Equation 1 below.

Total charge=basic charge+(output number*unit cost per sheet)   Equation 1

An image forming apparatus provider may set charging criteria in consideration of a rental period, a charging period, an estimated usage amount, a cost of consumable parts, a discount rate and a service cost by using a contract with an image forming apparatus user.

The server display unit 12 may display an operating state of the server 10 for image forming apparatus. The server display unit 12 may display the set charging criteria. The server display unit 12 may include a drive unit (not shown) to drive a thin film transistor-liquid crystal display (TFT-LCD).

The server storage unit 13 may store authentication information to authenticate a user or manager mode. The server storage unit 13 may store a charge calculation program and output amount information periodically collected from the respective image forming apparatuses 100-1, 100-2, . . . 100-$n$ and change histories of the charging criteria according to performance of the charge calculation program.

The server communication unit 14 may perform communication with the at least one image forming apparatus 100-1, 100-2, . . . 100-$n$ according to a designated protocol. The server communication unit 14 collects the output amount information from the at least one image forming apparatus 100-1, 100-2, . . . 100-$n$.

The server control unit 15 controls the overall operation of the server 10 for image forming apparatuses. The server control unit 15 may be implemented in a form in which software, such as the charge calculation program, is combined with hardware, such as a central processing unit (CPU).

The server control unit 15 may calculate the total charge according to output amounts of the image forming apparatuses 100-1, 100-2, . . . 100-$n$ within the charging period.

The server control unit 15 may calculate the total charge by detecting image forming apparatuses, output amounts of which are less than the basic output amount within the charging period, and summing the output amounts of the detected image forming apparatus, the output amounts of which are less than the basic output amount. Hereinafter, this will be described in more detail.

The server control unit 15 sets a virtual image forming apparatus. With reference to FIG. 4, an interface screen used to set the virtual image forming apparatus may include an item 110 representing a virtual image forming apparatus name, an item 111 representing a charging criterion to be applied to the virtual image forming apparatus, and an item 112 representing a management method of the virtual image forming apparatus. The name of the virtual image forming apparatus is a name of the set virtual image forming apparatus to discriminate the set virtual image forming apparatus from other virtual image forming apparatuses, the charging criterion refers to a charging criterion applied to the set virtual image forming apparatus, and the management method refers to a method to determine whether or not the set virtual image forming apparatus is manually or automatically managed.

The server control unit 15 sums the output amounts of the image forming apparatuses, the output amounts of which are less than the basic output amount within the charging period, and then allots the sum of the output amounts to the virtual image forming apparatus. The virtual image forming apparatus is regarded as an image forming apparatus to output the sum of the output amounts of the image forming apparatuses, the output amounts of which are less than the basic output amount within the charging period.

Figure 5:
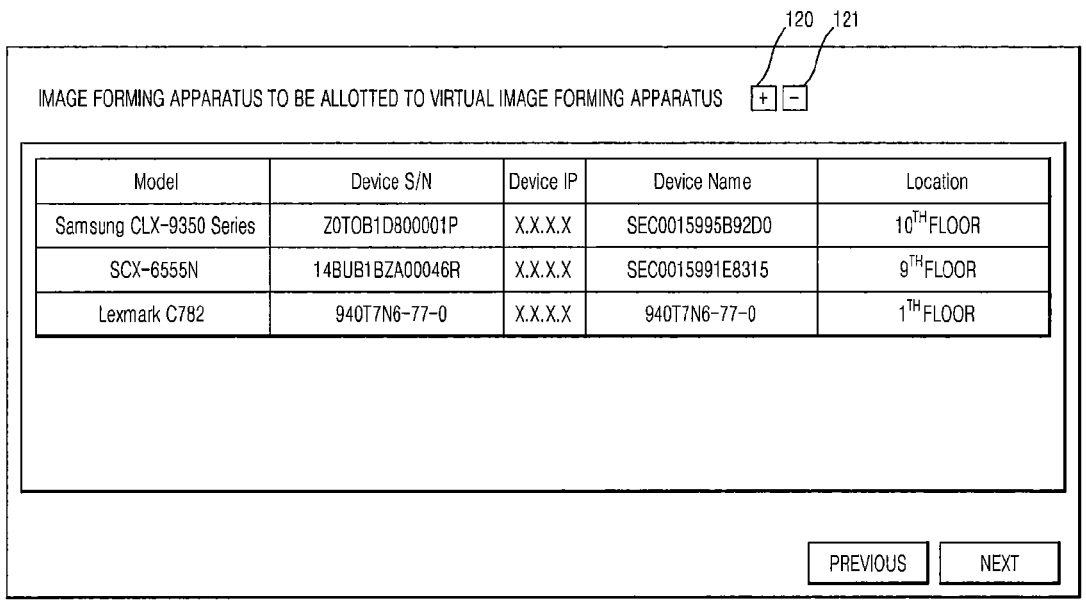
FIG. 5 is an interface screen used to manually set a virtual image forming apparatus in the server for image forming apparatuses in accordance with an embodiment.
Figure 6:
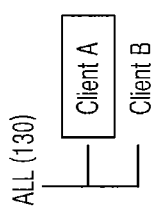
FIG. 6 is an interface screen used to manually add a virtual image forming apparatus in the server for image forming apparatuses in accordance with an embodiment.

When the server manager sets the management method of the virtual image forming apparatus to a manual management method, the server control unit 15 outputs the interface screen to manually set the image forming apparatuses to be allotted to the virtual image forming apparatus, through the server display unit 12. With reference to FIG. 5, the server manager may manipulate an image forming apparatus adding item 120 and an image forming apparatus deleting item 121. The server manager may add an image forming apparatus allotted to the virtual image forming apparatus by manipulating the adding item 120. Further, the server manager may delete an image forming apparatus allotted to the virtual image forming apparatus by manipulating the deleting item 121. FIG. 5 illustrates three image forming apparatuses allotted to the virtual image forming apparatus. Information of each of the image forming apparatuses allotted to the virtual image forming apparatus includes a model name, a serial number, an IP address, a device name, a location, etc. The server manager may manually set image forming apparatuses to be allotted to the virtual image forming apparatus. The server manager selects image forming apparatuses, actual output numbers of which are less than the basic output number, and then allots the selected image forming apparatuses to the virtual image forming apparatus. When the server manager selects the adding item 120, an interface screen of FIG. 6 is displayed. When the server manager selects the adding item 120, a user list 130 is displayed, and when the server manager selects one (client A or client B) of users displayed by the user list 130, an image forming apparatus list 131 used by the selected user is displayed. The server manager may randomly select image forming apparatuses displayed by the image forming apparatus list 131 so as to allot the selected image forming apparatuses to the virtual image forming apparatus.

The server control unit 15 sums the output numbers of at least one image forming apparatus which is allotted to the virtual image forming apparatus by the server manager, and calculates the total charge according to the charging criterion of the virtual image forming apparatus. Hereinafter, a manual management method of the virtual image forming apparatus will be exemplarily described.

The server manager (or the apparatus provider) sets a charging criterion of the image forming apparatuses 100-1, 100-2, . . . 100-$n$, as shown in FIG. 7. The server manager may set a charging criterion of the virtual image forming apparatus which is the same as the charging criterion of the image forming apparatuses 100-1, 100-2, . . . 100-$n$, as shown in FIG. 7. However, the charging criterion of the image forming apparatuses 100-1, 100-2, 100-$n$, may be set to be different from the charging criterion of the charging criterion of the virtual image forming apparatus. The charging criterion may include a charging criterion name, a basic output number, a basic charge and a unit cost per sheet. The server manager manually allots the image forming apparatuses 100-1, 100-2, . . . 100-$n$ to the virtual image forming apparatus. With reference to FIG. 8, the server manager may exemplarily select three image forming apparatuses from among the plural image forming apparatuses 100-1, 100-2, . . . 100-$n$.

The server control unit 15 collects output amounts of the image forming apparatuses 100-1, 100-2, . . . 100-$n$ allotted to the virtual image forming apparatus through the server communication unit 14, and calculates the total output amount of the image forming apparatuses 100-1, 100-2, . . . 100-$n$ allotted to the virtual image forming apparatus through Equation 2 below. The total output amount of the image forming apparatuses 100-1, 100-2, ... **100-*n*** allotted to the virtual image forming apparatus is regarded as the output amount of the virtual image forming apparatus.

Output amount of A=1000

Output amount of B=2000

Output amount of C=500

Total output amount=1000+2000+500=3500

Output amount of virtual image forming apparatus=3500      Equation 2

The server control unit 15 calculates the charge of the virtual image forming apparatus through Equation 3 below using the total output amount calculated through Equation 2.

Charge of color multi-functional machine 1(virtual image forming apparatus)=200+(3500*0.02)=$270      Equation 3

The charge of the virtual image forming apparatus calculated by the server control unit 15 through Equation 3 above is $270, but the conventionally calculated charge of the virtual image forming apparatus is obtained through Equation 4 below.

Charge of A=200+(1000*0.02)=$220

Charge of B=200+(2000*0.02)=$240

Charge of C=200+(500*0.02)=$210

Total charge=220+240+210=$670      Equation 4

In accordance with an embodiment, imposition of unnecessary basic charges is eliminated, and thus a user may save $400 (670-270).

When the server manager sets the management method of the virtual image forming apparatus to an automatic management method, the server control unit 15 outputs an interface screen to automatically set image forming apparatuses 100-1, 100-2, ... **100-*n* to be allotted to the virtual image forming apparatus through the server display unit 12. With reference to FIG. 9, the server manager may input a condition of the image forming apparatuses to be allotted to the virtual image forming apparatus. The server manager may select a basic output number direct input item 140 or charging policy-based items 141**.

The basic output number direct input item 140 allows the server manager to input a basic output number. When the basic output number is input to the basic output number direct input item 140, image forming apparatuses having output numbers less than the basic output number are allotted to the virtual image forming apparatus. For example, if the basic output number input to the basic output number direct input item 140 by the server manager is 1000, image forming apparatuses having output numbers less than 1000 are automatically allotted to the virtual image forming apparatus.

The charging policy-based items 141 include a model basic output number comparing item and an image forming apparatus basic output number comparing item.

When the server manager inputs 30% to the model basic output number comparing item, the server control unit 15 allots image forming apparatuses having output numbers which are below 30% of the basic output number set to a model to the virtual image forming apparatus. Here, the basic output number set to the model is an output number set if the charging criterion according to model is applied. With reference to FIG. 10, the charging criterion of a specific model SCX-655L may be set and a basic output number of the specific model SCX-655L may be set.

When the server manager inputs 30% to the image forming apparatus basic output number comparing item, the server control unit 15 allots image forming apparatuses having output numbers which are below 30% of the basic output number set in the charging criterion to the virtual image forming apparatus.

After set of the condition of image forming apparatuses allotted to the virtual image forming apparatus, the server control unit 15 may set a scale of the virtual image forming apparatus by input of a server user. The scale of the virtual image forming apparatus refers to the number of image forming apparatuses allotted to the virtual image forming apparatus or the size of the total output amount of the image forming apparatuses allotted to the virtual image forming apparatus.

With reference to FIG. 11, when the server manager clicks a direct input item from among image forming apparatus number-based items 150 and directly inputs an allowable number of the image forming apparatuses 100-1, 100-2, ... **100-*n*, the server control unit 15 allots the number of image forming apparatuses which is below the allowable number to the virtual image forming apparatus. For example, if the number of image forming apparatuses satisfying a virtual image forming apparatus allotting condition, i.e., an output amount condition, is 30 and the server manager sets 20 as the allowable number of image forming apparatus, a virtual image forming apparatus A to which 20 image forming apparatuses are allotted and an image forming apparatus B to which 10 image forming apparatuses are allotted are generated. Here, the name of the virtual image forming apparatus A is a predetermined name (for example, V1000), and the name of the virtual image forming apparatus B is automatically set by a program stored in the server storage unit 13**. However, the charging criterion of the virtual image forming apparatus B is the same as the charging criterion of the virtual image forming apparatus A.

When the server manager inputs a value to a virtual image forming apparatus basic output number comparing item from among image forming apparatus output number-based items 151, the server control unit 15 may restrict output numbers allotted to one virtual image forming apparatus corresponding to the basic output number of the charging criterion of the virtual image forming apparatus. For example, if the basic output number of the virtual image forming apparatus is 300 and the total output number of image forming apparatuses which will be allotted to the virtual image forming apparatus is 400 under the condition that the server manager inputs 200% to the virtual image forming apparatus basic output number comparing item, a virtual image forming apparatus C having the output number of 300 and a virtual image forming apparatus D having the output number of 100 are generated. Here, the name of the virtual image forming apparatus C is a predetermined name (for example, V1000), and the name of the virtual image forming apparatus D is automatically set by the program stored in the server storage unit 13. However, the charging criterion of the virtual image forming apparatus D is the same as the charging criterion of the virtual image forming apparatus C. Hereinafter, an automatic management method of the virtual image forming apparatus will be exemplarily described.

The server input unit 11 receives charging criteria of the image forming apparatuses 100-1, 100-2, ... **100-*n* and a charging criterion of a virtual image forming apparatus from the server manager. For example, as shown in FIG. 12**, charging criteria of three models of the image forming apparatuses 100-1, 100-2, . . . 100-n and a charging criterion of one virtual image forming apparatus (color multi-functional machine 2) may be set.

The server manager may select the automatic management method in the interface screen of FIG. 4 as the management method of the virtual image forming method, input 30% to the model basic output number comparing item in the interface screen to set the condition of image forming apparatuses which will be allotted to the virtual image forming apparatus of FIG. 9, and input 100% to the virtual image forming apparatus basic output number comparing item in the interface screen to set the scale of the image forming apparatuses which will be allotted to the virtual image forming apparatus of FIG. 11, as stated in Equation 5 below.

1) Charging criterion: color multi-functional machine B

2) Management method: automatic

3) Condition of image forming apparatuses to be allotted: 30% of model basic output number 4) Scale of image forming apparatuses: 100% of virtual image forming apparatus basic output number   Equation 5

If there are three image forming apparatuses which are objects managed by the server 10, as shown in FIG. 13, the server control unit 15 collects output amounts of the respective image forming apparatuses and determines image forming apparatuses which will be allotted to the virtual image forming apparatus. If the output amount of a specific image forming apparatus (S/N: ZOTOB1DZ800001P) of a model A is 300, the output amount of a specific image forming apparatus (S/N: 14BUB1 BZA00046R) of a model B is 800, and the output amount of a specific image forming apparatus (S/N: 940T7N6-77-0) of a model C is 500, the server control unit 15 determines image forming apparatuses which will be allotted to the virtual image farming apparatus by calculating an output number corresponding to 30% of the model basic output number of the virtual image forming apparatus by Equation 6 below.

(1) ZOTOB1DZ800001P=(basic output number of Samsung CLX-9250 9350 Series)*30% of model basic output number=2000*0.3=600

(2) 14BUB1BZA00046R=(basic output number of SCX-6555N)*30% of model basic output number=3000*0.3=900

(3) 940T7N6-77-0=(basic output number of Lexmark C782)*30% of model basic output number=300   Equation 6

The server control unit 15 compares the output numbers of the image forming apparatuses to 30% of the outputs numbers of the model basic output numbers calculated by Equation 6, and allots image forming apparatuses, the output numbers of which are less than 30% of the outputs numbers of the model basic output numbers, to the virtual image forming apparatus. In the above-described example, the output amount of the specific image forming apparatus (S/N: ZOTOB1DZ800001P) of the model A is 300 and 30% of the model basic output number is 600. The output amount of the specific image forming apparatus (S/N: 14BUB1BZA00046R) of the model B is 800 and 30% of the model basic output number is 900. The output amount of the specific image forming apparatus (S/N: 940T7N6-77-0) of the model C is 500 and 30% of the model basic output number is 300. Therefore, the specific image forming apparatus (S/N: ZOTOB1DZ800001P) of the model A and the specific image forming apparatus (S/N: 14BUB1BZA00046R) of the model B satisfy the condition of image forming apparatuses to be allotted to the virtual image forming apparatus.

The sever control unit 15 judges whether or not the number or the total output amount of the image forming apparatuses satisfying the condition of image forming apparatuses to be allotted to the virtual image forming apparatus satisfies the scale condition of the virtual image forming apparatus.

Since the scale condition of the virtual image forming apparatus is set to be 100% of the basic output number of the virtual image forming apparatus, as stated in Equation 5, the server control unit 15 may allot all the output numbers of the image forming apparatuses, allotted to the virtual image forming apparatus, to the virtual image forming apparatus if the total output number allottable to the virtual image forming apparatus exceeds 5000.

5000*1(100%)=5000(maximum allowable value of virtual image forming apparatus)>300+800(total output number of allotted image forming apparatuses)   Equation 7

The server control unit 15 generates one virtual image forming apparatus, because the total output number of the specific image forming apparatus (S/N: ZOTOB1DZ800001P) of the model A and the specific image forming apparatus (S/N: 14BUB1BZA00046R) of the model B does not exceed the maximum allowable value.

The server control unit 15 calculates a charge according to the total output number allotted to the virtual image forming apparatus by Equation 8 below.

Virtual image forming apparatus (color multi-functional machine 2)=basic charge of color multi-functional machine 2+(output amount of color multi-functional machine 2*unit cost per sheet)=300+(1100*0.03)=$333   Equation 8

Further, the server control unit 15 calculates a charge of the image forming apparatus (S/N: 940T7N6-77-0) of the model C which is not allotted to the virtual image forming apparatus according to its own charging criterion, as stated in Equation 9 below.

Charge of 940T7N6-77-0=(basic charge of Lexmark C782)+(output amount of 940T7N6-77-0*unit cost per sheet)=100+(500*0.01)=$105   Equation 9

The server control unit 15 may reasonably calculate charges to be paid by a user through the above-described method. Equation 10 represents charges calculated if the conventional charge calculation method is applied.

(1) ZOTOB1DZ800001P=(basic output number of Samsung CLX-9250 9350 Series)+(output number of ZOTOB1DZ800001P*unit cost per sheet)=200+(300*0.03)=$209

(2) 14BUB1BZA00046R=(basic output number of SCX-6555N)+(output number of Z14BUB1BZA00046R*unit cost per sheet)=300+(800*0.2)=$216

(3) 940T7N6-77-0=(basic charge of Lexmark C782)+(output amount of 940T7N6-77-0*unit cost per sheet)=100+(500*0.01)=$105

(4) Total charge=209+216+105=$530   Equation 10

As described above, the total charge is $438 if the method in accordance with an embodiment is used, and is $530 if the conventional method is used.

Each of the image forming apparatuses 100-1, 100-2, . . . 100-n includes an image forming apparatus storage unit 101, an image forming apparatus communication unit 102, an image forming apparatus control unit 103 and an image formation unit 104.

The image forming apparatus storage unit 101 may store printing data and printing usage amount information received from the host apparatuses 200-1, 200-2, ... 200-n. The image forming apparatus storage unit 101 may be provided with an internal storage medium, such as an HDD, or a USB port connectable to a portable storage medium, such as a USB memory or a memory card.

The image forming apparatus communication unit 102 may include a wired or wireless communication module connectable to external apparatuses, such as the host apparatuses 200-1, 200-2, ... 200-n, by a network according to a local or designated protocol or a USB port connectable to a portable storage medium, such as a USB or a memory.

The image forming apparatus control unit 103 counts the number of printed sheets of paper, stores the counted number in the image forming apparatus storage unit 101, and transmits the printing usage amount information stored in the image forming apparatus storage unit 101 to the server 10 for image forming apparatuses according to a request of the server 10 for image forming apparatuses.

The image formation unit 104 forms an image on a storage medium under control of the image forming apparatus control unit 103.

FIG. 14 is a flowchart illustrating calculation of charges by generating a virtual image forming apparatus in the server for image forming apparatuses in accordance with an embodiment.

The server input unit 11 receives charging criteria input by a user. The charging criteria may include general charging criteria and a virtual image forming apparatus charging criterion. The general charging criteria refers to charging criteria of image forming apparatuses 100-1, 100-2, ... 100-n which are generally set, and each of the general charging criteria may include a charging criterion name, a basic output number, a basic charge and a unit cost per sheet. The virtual image forming apparatus charging criterion refers to a charging criterion applied to the virtual image forming apparatus and may include a charging criterion name, a basic output number, a basic charge and a unit cost per sheet (Operation 300).

The server control unit 15 receives information regarding output amounts of recording medium from the image forming apparatuses 100-1, 100-2, ... 100-n through the server communication unit 14. The server control unit 15 may receive output amounts of recording medium from all the image forming apparatuses 100-1, 100-2, ... 100-n rented to a specific user (Operation 310).

The server control unit 15 judges whether or not generation of a virtual image forming apparatus is necessary after collection of the information regarding the output amounts from the image forming apparatuses 100-1, 100-2, ... 100-n. If the image forming apparatuses are manually allotted to the virtual image forming apparatus by the user, the server control unit 15 may judge that generation of the virtual image forming apparatus is necessary. If the automatic management method is set, the server control unit 15 judges that generation of the virtual image formation according to a predetermined option is necessary. The predetermined option is an option for an output number. The option for the output number may be an option relating to comparison to a percentage of a model basic output number or a percentage of an image forming apparatus basic output number. The model basic output number refers to a basic output number of each of models set according to the charging criterion, and the image forming apparatus basic output number refers to a basic output number of each of the image forming apparatuses 100-1, 100-2, ... 100-n set according to the charging criterion (Operation 320).

Upon judging that generation of the virtual image forming apparatus is necessary, the server control unit 15 calculates charges using both the charging criterion of the virtual image forming apparatus and the general charging criteria. Calculation of the charges using both the charging criterion of the virtual image forming apparatus and the general charging criteria includes calculating charges of image forming apparatuses, which are allotted to the virtual image forming apparatus, according to the charging criterion of the virtual image forming apparatus and calculating charges of image forming apparatuses, which are not allotted to the virtual image forming apparatus, according to the general charging criteria (Operation 330).

Upon judging that generation of the virtual image forming apparatus is not necessary, the server control unit 15 calculates charges of all the image forming apparatuses 100-1, 100-2, ... 100-n according to the general charging criteria (Operation 340).

Control methods according to the above-described embodiments may be recorded in non-transitory computer-readable media including computer program instructions (computer readable instructions) to implement various operations embodied by a computer. The media may also include, alone or in combination with the program instructions, data files, data structures, and the like. The computer program instructions may be executed by one or more processors or processing devices in a server or example. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

The non-transitory computer-readable media may also be a distributed network of storage devices, so that the computer program instructions are stored and executed in a distributed fashion. The program instructions may be executed by one or more processors or processing devices. The computer-readable media may also be embodied in at least one application specific integrated circuit (ASIC) or Field Programmable Gate Array (FPGA).

As is apparent from the above description, a server for image forming apparatuses and a control method thereof in accordance with an embodiment enable charges of image forming apparatuses to be calculated using a virtual image forming apparatus, thereby being capable of calculating charges reasonable to both a service manager and a user.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A server for image forming apparatuses comprising:
   a server input unit to receive charging criteria of image forming apparatuses and a charging criterion of a virtual image forming apparatus;

a server communication unit to receive information regarding output amounts from the image forming apparatuses; and a server control unit to generate the virtual image forming apparatus and to calculate charges of the image forming apparatuses according to the charging criterion of the virtual image forming apparatus, when the output amounts of the image forming apparatuses are less than basic output amounts of the charging criteria of the image forming apparatuses, wherein the virtual image forming apparatus includes the use of at least two of the image forming apparatuses, wherein the server control unit generates the virtual image forming apparatus according to a restriction condition for the number of the virtual image forming apparatus or a restriction condition for the output amounts, and wherein, when the number of image forming apparatuses allotted to the virtual image forming apparatus does not satisfy the restriction condition for the number, the server control unit generates a plurality of virtual image forming apparatuses and divides the number of the allotted image forming apparatuses according to the plurality of virtual image forming apparatuses.

2. The server for image forming apparatuses according to claim 1, wherein the generation of the virtual image forming apparatus by the server control unit includes generating the virtual image forming apparatus by manually receiving image forming apparatuses allotted to the virtual image forming apparatus.

3. The server for image forming apparatuses according to claim 1, wherein the generation of the virtual image forming apparatus by the server control unit includes generating the virtual image forming apparatus to which image forming apparatuses having output amounts less than the basic output amounts of the charging criteria of the image forming apparatuses are allotted.

4. The server for image forming apparatuses according to claim 1, wherein, when the sum of the output amounts of image forming apparatuses allotted to the virtual image forming apparatus does not satisfy the restriction condition for output amounts, the server control unit generates a plurality of virtual image forming apparatuses and divides the sum of the allotted output amounts of the image forming apparatuses according to the plurality of virtual image forming apparatuses.

5. The server for image forming apparatuses according to claim 1, wherein the server control unit calculates charges of image forming apparatuses, which are allotted to the virtual image forming apparatus, according to the charging criterion of the virtual image forming apparatus, and calculates charges of image forming apparatuses, which are not allotted to the virtual image forming apparatus, according to the charging criterion of the image forming apparatuses.

6. The server for image forming apparatuses according to claim 1, wherein the server further comprises a server display unit to display a user interface which displays input from a user, which is used by the server control unit to generate the virtual image forming apparatus.

7. A control method of a server for image forming apparatuses comprising:

receiving charging criteria of image forming apparatuses and a charging criteria of a virtual image forming apparatus;

receiving information regarding output amounts from the image forming apparatuses; and generating the virtual image forming apparatus and calculating, using at least one processor, charges of the image forming apparatuses according to the charging criterion of the virtual image forming apparatus, when the output amounts of the image forming apparatuses are less than basic output amounts of the charging criteria of the image forming apparatuses, wherein the virtual image forming apparatus includes the use of at least two of the image forming apparatuses, wherein the generation of the virtual image forming apparatus by the server control unit includes generating the virtual image forming apparatus according to a restriction condition for the number of the virtual image forming apparatus or a restriction condition for the output amounts, and wherein, when the number of image forming apparatuses allotted to the virtual image forming apparatus does not satisfy the restriction condition for the number, a plurality of virtual image forming apparatuses is generated and the number of the allotted image forming apparatuses is divided according to the plurality of virtual image forming apparatuses.

8. The control method according to claim 7, wherein the generation of the virtual image forming apparatus by the server control unit includes generating the virtual image forming apparatus by manually receiving image forming apparatuses allotted to the virtual image forming apparatus.

9. The control method according to claim 7, wherein the generation of the virtual image forming apparatus by the server control unit includes generating the virtual image forming apparatus to which image forming apparatuses having output amounts less than the basic output amounts of the charging criteria of the image forming apparatuses are allotted.

10. The control method according to claim 7, wherein, when the sum of the output amounts of image forming apparatuses allotted to the virtual image forming apparatus does not satisfy the restriction condition for output amounts, a plurality of virtual image forming apparatuses is generated and the sum of the output amounts of the allotted image forming apparatuses is divided according to the plurality of virtual image forming apparatuses.

11. The control method according to claim 7, wherein charges of image forming apparatuses, which are allotted to the virtual image forming apparatus, are calculated according to the charging criterion of the virtual image forming apparatus, and charges of image forming apparatuses, which are not allotted to the virtual image forming apparatus, are calculated according to the charging criterion of the image forming apparatuses.

12. The control method according to claim 7, wherein the output amounts of the image forming apparatuses being less than basic output amounts of the charging criteria of the image forming apparatuses denotes that the output amounts of the image forming apparatuses are less than basic output amounts of models of the charging criteria of the image forming apparatuses or basic output amounts of the image forming apparatuses.

* * * * *

UNITED STATES PATENT AND TRADEMARK OFFICE
CERTIFICATE OF CORRECTION

PATENT NO. : 8,892,476 B2  
APPLICATION NO. : 13/443463  
DATED : November 18, 2014  
INVENTOR(S) : Jung Mo Yeon et al.

Page 1 of 1

It is certified that error appears in the above-identified patent and that said Letters Patent is hereby corrected as shown below:

On the Title Page

Column 2, Item [74] (Attorney, Agent or Firm), Line 1, delete "Halsely" and insert -- Halsey --, therefor.

Signed and Sealed this
Second Day of June, 2015

Michelle K. Lee
*Director of the United States Patent and Trademark Office*